US012736983B2

(12) United States Patent
Zhang et al.

(10) Patent No.: US 12,736,983 B2
(45) Date of Patent: Sep. 15, 2026

(54) HYBRID MULTI-ROBOT TASK ALLOCATION USING LARGE LANGUAGE MODELS

(71) Applicant: The Hong Kong University of Science and Technology, Kowloon (HK)

(72) Inventors: Huibo Zhang, Harbin (CN); Fumin Zhang, Kowloon (HK)

(73) Assignee: The Hong Kong University of Science and Technology, Kowloon (HK)

( * ) Notice: Subject to any disclaimer, the term of this patent is extended or adjusted under 35 U.S.C. 154(b) by 8 days.

(21) Appl. No.: 19/072,468

(22) Filed: Mar. 6, 2025

(65) Prior Publication Data

US 2026/0064132 A1 Mar. 5, 2026

Related U.S. Application Data

(60) Provisional application No. 63/690,807, filed on Sep. 5, 2024.

(51) Int. Cl.
*G05D 1/648* (2024.01)
*G05D 1/65* (2024.01)
(Continued)

(52) U.S. Cl.
CPC ............... *G05D 1/648* (2024.01); *G05D 1/65* (2024.01); *G05D 1/69* (2024.01); *G06F 40/20* (2020.01)

(58) Field of Classification Search
CPC . G05D 1/648; G05D 1/65; G05D 1/69; G06F 40/20
See application file for complete search history.

(56) References Cited

U.S. PATENT DOCUMENTS

2024/0114236 A1* 4/2024 Rivkin .................. B25J 9/1679
2025/0114937 A1* 4/2025 Cote ...................... B25J 9/1661

FOREIGN PATENT DOCUMENTS

WO 2024182721 A1 9/2024

OTHER PUBLICATIONS

Said Al-Abri, A Derivative-Free Optimization Method With Application to Functions With Exploding and Vanishing Gradients, IEEE Control Systems Letters, vol. 5, No. 2, Apr. 2021 (Year: 2021).*

(Continued)

*Primary Examiner* — Arslan Azhar
(74) *Attorney, Agent, or Firm* — Amin, Turocy & Watson, LLP

(57) ABSTRACT

The subject technology relates to hybrid multi-robot task allocation using large language models (LLMs). An example method facilitating hybrid multi-robot task allocation using LLMs includes generating, based on an output of an LLM, first assignment data representative of first allocations of respective first robots of a group of robots to respective tasks of a group of tasks, where the output of the LLM is generated based on LLM input data including capability information associated with the group of robots and task information associated with the group of tasks; transforming the first assignment data to second assignment data using derivative-free optimization, where the second assignment data is representative of second allocations of respective second robots of the group of robots to the respective tasks; and facilitating performance of the respective tasks by the respective second robots according to the second assignment data.

20 Claims, 14 Drawing Sheets

(51) Int. Cl.
*G05D 1/69* (2024.01)
*G06F 40/20* (2020.01)

(56) References Cited

OTHER PUBLICATIONS

Jakub Kudela, Benchmarking Derivative-Free Global Optimization Methods on Variable Dimension Robotics Problems, IEEE (Year: 2024).*
Achiam et al., "GPT-4 Technical Report", arXiv:2303.08774v6, Mar. 4, 2024, 100 pages.
Al-Abri et al., "A Derivative-Free Optimization Method with Application toFunctions with Exploding and Vanishing Gradients", IEEE Control Systems Letters, Jun. 2020, 7 pages.
Atay et al., "Mixed-integer Linear Programming Solution to Multirobot Task Allocation Problem", Computer Science and Engineering, Jan. 1, 2006, 11 pages.
Brown et al., "Language Models are Few-Shot Learners", 34th Conference on Neural Information Processing Systems (NeurIPS 2020), 2020, 25 pages.
Chen et al., "Introspective Tips: Large Language Model for In-Context Decision Making", arXiv:2305.11598v1, May 19, 2023, 22 pages.
Chen et al., "Hybrid SUSD-Based Task Allocation for Heterogeneous Multi-Robot Teams", 2023 IEEE International Conference on Robotics and Automation, May 29-Jun. 2, 2023, pp. 1400-1406.
Chen et al., "Game-theoretical Approach to Multi-robot Task Allocation Using a Bio-inspired Optimization Strategy", 2023 IEEE/RSJ International Conference on Intelligent Robots and Systems (IROS) Oct. 1-5, 2023, pp. 5388-5393.
Choi et al., "Consensus-Based Decentralized Auctions for Robust Task Allocation", IEEE Transactions on Robotics, vol. 25, No. 4, Aug. 2009, pp. 912-926.
Chopra et al., "A Distributed Version of the Hungarian Method for Multi-Robot Assignment", arXiv:1805.08712v1, May 22, 2018, 16 pages.
Dias et al., "Market-Based Multirobot Coordination: A Survey and Analysis", Proceedings of the IEEE, vol. 94, No. 7, Jul. 2006, pp. 1257-1270.
Falsone et al., "A Decentralized Approach to Multi-agent MILPS: Finite-time Feasibility and Performance Guarantees", arXiv:1706.08788v1, Jun. 27, 2017, 10 pages.
Gerkey et al., "Sold!: Auction Methods for Multirobot Coordination", IEEE Transactions on Robotics and Automation, vol. 18, No. 5, Oct. 2002, pp. 758-768.
Kannan et al., "SMART-LLM: Smart Multi-Agent Robot Task Planning using Large Language Models", arXiv:2309.10062v2, Mar. 23, 2024, 8 pages.
Krishnamurthy et al., "Can Large Language Models Explore In-Context?", arXiv:2403.15371v3, Oct. 28, 2024, 33 pages.
Kuhn, Harold W., "The Hungarian Method for the Assignment Problem", Naval Research Logistics Quarterly, vol. 2, Issue 1-2, Mar. 1955, 15 pages.
Mosteo et al., "Simulated Annealing for Multirobot Hierarchical Task Allocation with Flexible Constraints and Objective Functions", Citeseer, 2006, 8 pages.
Zhou et al., "Large Language Model (LLM)-enabled In-context Learning for Wireless Network Optimization: A Case Study of Power Control", arXiv:2408.00214v1, Aug. 1, 2024, 6 pages.
Zhao, et al., "A Survey of Optimization-based Task and Motion Planning: From Classical To Learning Approaches," arXiv:2404.02817v5 [cs.RO] Oct. 7, 2024.
Gupte, et al., "REBEL: Rule-based and Experience-enhanced Learning with LLMs for Initial Task Allocation in Multi-Human Multi-Robot Teams," arXiv:2409.16266v1 [cs.RO] Sep. 24, 2024.
Chen, et al., "Scalable Multi-Robot Collaboration with Large Language Models: Centralized or Decentralized Systems?," arXiv:2309.15943v2 [cs. RO] Mar. 22, 2024.
Van De Laar, "VernaCopter: Natural Language-based Drone Control using Large Language Models and Formal Specifications," Student thesis: Master, Aug. 2024, https://research.tue.nl/en/studentTheses/vernacopter.

* cited by examiner

HYBRID MULTI-ROBOT TASK ALLOCATION USING LARGE LANGUAGE MODELS

CROSS-REFERENCE TO RELATED APPLICATION

The present application claims the benefit of priority to U.S. Provisional Patent Application No. 63/690,807, filed Sep. 5, 2024, and entitled "Hybrid Approach to Multi-Robot Task Allocation Using the In-context Learning Capabilities of Large Language Models," the entirety of which priority application is incorporated herein by reference.

BACKGROUND

Multi-robot task allocation (MRTA) is a problem formulation that is widely used in fields, such as robotic exploration, search and rescue operations, industrial automation, and other fields. The main goal of MRTA is to efficiently and effectively assign tasks to a group of heterogeneous robots, which can differ in terms of capabilities or other properties, in order to maximize the performance of an associated system.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

In an implementation, a system is described herein. The system can include at least one processor and at least one memory that stores executable instructions that, when executed by the at least one processor, facilitate performance of operations. The operations can include generating, based on an output of a language model, first task allocations that associate respective first robots of a group of robots with respective tasks of a group of tasks. The output of the language model can be generated based on a natural language input comprising capability information associated with the group of robots and task information associated with the group of tasks. The operations can also include transforming the first task allocations to second task allocations via derivative-free optimization, where the second task allocations associate respective second robots of the group of robots with the respective tasks of the group of tasks. The operations can further include causing the respective second robots of the group of robots to perform the respective tasks of the group of tasks according to the second task allocations.

In another implementation, a method is described herein. The method can include generating, by a system including at least one processor and based on an output of a large language model (LLM), first assignment data representative of first allocations of respective first robots of a group of robots to respective tasks of a group of tasks. The output of the LLM can be generated based on LLM input data comprising capability information associated with the group of robots and task information associated with the group of tasks. The method can further include transforming, by the system, the first assignment data to second assignment data using derivative-free optimization, where the second assignment data is representative of second allocations of respective second robots of the group of robots to the respective tasks of the group of tasks. The method can additionally include facilitating, by the system, performance of the respective tasks of the group of tasks by the respective second robots of the group of robots according to the second assignment data.

In an additional implementation, a non-transitory machine-readable medium is described herein that can include instructions that, when executed by at least one processor, facilitate performance of operations. The operations can include generating, based on an output of an LLM, first task allocations that assign respective first robots of a group of robots to respective tasks of a group of tasks, where the output of the LLM is generated based on input data comprising capability data associated with the group of robots and task data associated with the group of tasks; transforming the first task allocations to second task allocations via derivative-free optimization, where the second task allocations assign respective second robots of the group of robots to the respective tasks of the group of tasks; and causing the respective second robots of the group of robots to perform the respective tasks of the group of tasks according to the second task allocations.

DESCRIPTION OF DRAWINGS

Various non-limiting embodiments of the subject disclosure are described with reference to the following figures, wherein like reference numerals refer to like parts throughout unless otherwise specified.

DETAILED DESCRIPTION

Figure 1:
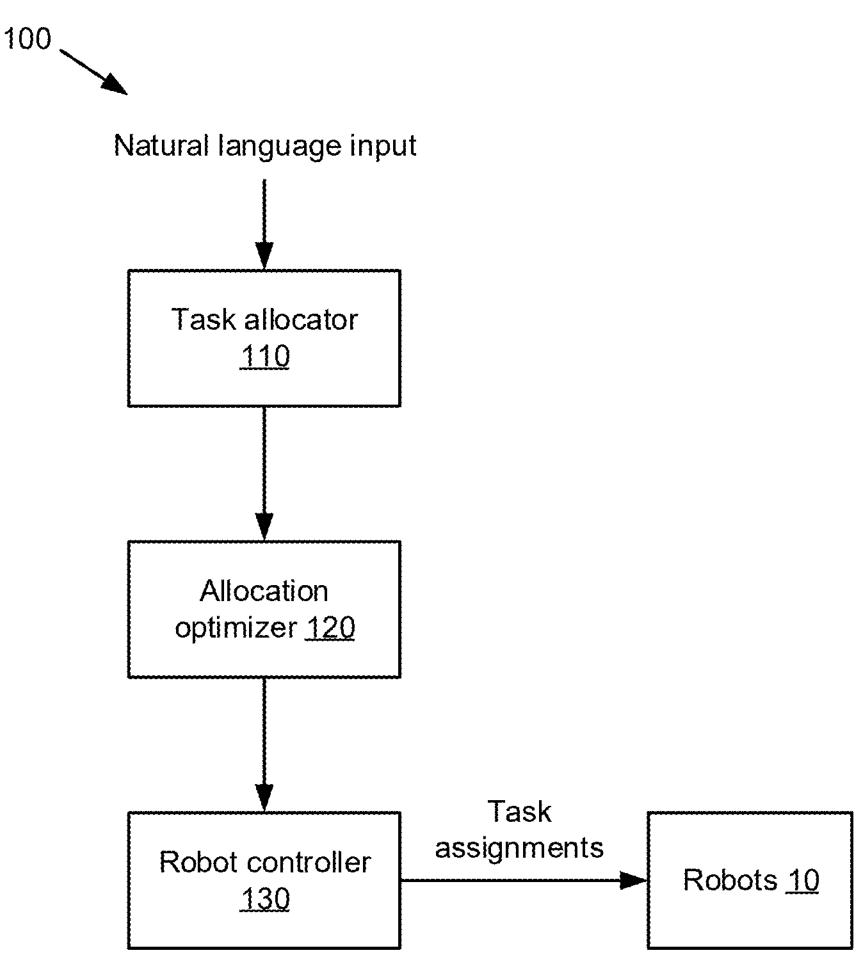
FIGS. 1-2 are block diagrams of respective systems that facilitate hybrid multi-robot task allocation (MRTA) using large language models (LLMs) in accordance with various implementations described herein.

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring subject matter.

Various implementations described herein relate to techniques for employing in-context learning for large language models (LLMs) to provide a hybrid optimization framework for multi-robot task allocation (MRTA). Implementations as described herein can improve conventional MRTA approaches, such as market-based schemes, optimization-based schemes based on speed-up and slow-down (SUSD) optimization and/or other suitable techniques, or other approaches, by leveraging the contextual understanding ability of an LLM. Incorporating an LLM can remove the need for detailed information regarding the utility function for MRTA and assist an MRTA algorithm in escaping local optima without relying on human feedback. In addition, implementations described herein can utilize in-context learning to enable the LLM to adapt to the underlying optimization algorithm(s).

Implementations as described herein can additionally provide techniques to instigate in-context learning for LLMs and enable convergence to consensus between an LLM and the underlying optimization algorithm(s). These techniques can reduce the need for expert intervention and enhance applicability and/or scalability to complex task allocation problems. By utilizing a hybrid approach to MRTA as described herein, task allocation effectiveness can be increased relative to conventional MRTA methods.

While traditional MRTA methods, such as those based on market-based and optimization-based algorithms, can provide effective solutions in some cases, these methods have drawbacks that can render them less suitable for generalized use. For instance, market-based methods can get stuck in sub-optimal solutions, and optimization-based methods are usually computationally expensive. In addition, optimization-based solutions generally require a user to provide specific mathematical problem descriptions, and they also rely on professional optimization knowledge and precise numerical input.

In contrast to traditional methods that require detailed mathematical formulations, implementations as described herein can integrate LLMs into the MRTA process. In doing so, implementations as described herein can facilitate a hybrid MRTA approach that allows task allocations to be generated directly from natural language inputs. Additionally, by leveraging in-context learning, the LLM can adapt its task allocation strategies based on the specific context provided by descriptions of tasks, robot capabilities, and/or other inputs. Various implementations as described herein can make advanced MRTA optimization techniques more accessible to non-experts while also introducing a degree of flexibility through iterative feedback, which can allow the LLM to refine its outputs over time.

With reference now to the drawings, FIG. 1 illustrates a block diagram of a system 100 that facilitates hybrid MRTA using LLMs in accordance with various implementations described herein. System 100 as shown in FIG. 1 includes executable components, e.g., a task allocator 110, an allocation optimizer 120, and a robot controller 130, each of which can operate as described in further detail below. In an implementation, the components 110, 120, 130 of system 100 can be implemented in hardware, software, or a combination of hardware and software. By way of example, the components 110, 120, 130 can be stored on at least one memory and executed by at least one processor. An example of a computer architecture including a processor and memory that can be used to implement the components 110, 120, 130, as well as other components as will be described herein, is shown and described in further detail below with respect to FIG. 16. In some implementations, the executable components 110, 120, 130 of system 100, and/or other elements of system 100, can communicate with each other via a bus and/or other components that provide intercommunication between various elements of system 100.

Additionally, it is noted that the functionality of the respective components shown and described herein can be implemented via a single computing device and/or a combination of devices. For instance, in various implementations, the task allocator 110 shown in FIG. 1 could be implemented via a first device, the allocation optimizer 120 could be implemented via the first device or a second device, and the robot controller 130 could be implemented via the first device, the second device, or a third device. Also, or alternatively, the functionality of a single component could be divided among multiple devices in some implementations.

As further shown in FIG. 1, the components 110, 120, 130 of system 100 can facilitate assigning tasks to and/or otherwise controlling one or more robots 10. As used herein, the term "robot" refers to a vehicle or other device that can operate based on assigned instructions with limited to no human intervention. Examples of robots 10 that can be controlled by system 100 can include, but are not limited to, unmanned aerial vehicles (UAVs) or drones, autonomous underwater vehicles (AUVs), autonomous surface vehicles (ASVs), self-driving automobiles or other autonomous (unmanned) land-based vehicles, and/or any other suitable type of autonomous or unmanned device(s).

With reference now to the components of system 100, the task allocator 110 can generate, based on an output of a language model (e.g., an LLM and/or any other suitable machine learning (ML) model that can process natural language inputs), first task allocations that associate respective robots 10 with respective tasks of a group of tasks to be assigned to the robots 10. As will be described in further detail below (e.g., with reference to FIG. 4), the output of the language model can be generated based on a natural language input that includes information such as capability information associated with the associated robots 10, task information associated with the group of tasks to be assigned to the robots 10, and/or other suitable information.

The allocation optimizer 120 of system 100 can transform the first task allocations generated by the task allocator 110 to second task allocations via one or more derivative-free optimization techniques. Similar to the first task allocations, the second task allocations can associate respective ones of the robots 10 with the respective tasks of the group of tasks. The robots 10 associated with respective tasks via the allocation optimizer 120 can be the same as, or different from, the robots assigned to those tasks by the task allocator 110. For clarity, the term "first robots" is used herein to denote robots 10 assigned to tasks by the task allocator 110, while the term "second robots" is used to denote robots 10 assigned to tasks by the allocation optimizer 120.

While various implementations of the allocation optimizer 120 described herein are presented in relation to the use of speed-up and slow-down (SUSD) optimization as a derivative-free optimization technique, it is noted that SUSD optimization is merely one example of a derivative-free optimization technique that could be used, and that other techniques are also possible without departing from the scope of this description or the claimed subject matter.

Based on the second task allocations generated by the allocation optimizer 120, the robot controller 130 of system 100 can cause the respective second robots given in the second task allocations to perform the respective tasks of the group of tasks according to the second task allocations. By way of example, the robot controller 130 can include a transceiver or other communications mechanism that can communicate tasks and/or other instructions to respective robots 10, based on which the robots 10 can perform tasks as instructed.

As will be described in further detail herein, system 100 can enable improved versatility in robot task assignment, allowing it to be easily adapted to various industries, scenarios, and/or task types. For instance, various task types that can be assigned to robots 10 by system 100 can include, but are not limited to, the following:

Search and rescue operations and/or other disaster response: System 100 can dynamically allocate robots 10 for tasks such as debris clearance, survivor search, medical assistance, or the like based on real-time updates from a disaster site, which can be described through simple natural language inputs by rescue team leaders. Robots 10 deployed in such a scenario could be capable of undertaking various rescue operations, such as navigating debris, delivering supplies, and/or other related tasks.

Industrial automation: In manufacturing settings, system 100 can adjust robot tasks for assembly, inspection, material handling, or the like in real time to account for changes in factors such as production schedules, machine downtime, or urgent orders.

Environmental monitoring: System 100 can reallocate robotic resources based on the latest environmental reports and data collected on-site, ensuring optimal coverage and data accuracy.

Agricultural operations: In agriculture, robots 10 can be tasked with planting, harvesting, pest control, and/or other tasks based on the current crop state, weather conditions, or other factors.

Smart city robotics: System 100 could act as a centralized control system for managing robots 10 tasked with various urban services, such as waste collection, maintenance, public safety, or the like. System 100 could dynamically allocate tasks to robots 10 based on priority and/or urgency, which could be communicated via natural language inputs.

In addition, system 100 can provide improved scalability for robot task allocation via the ability to handle increasing task complexity and/or larger numbers of robots or tasks without a corresponding increase in computational or manual oversight requirements.

Figure 2:
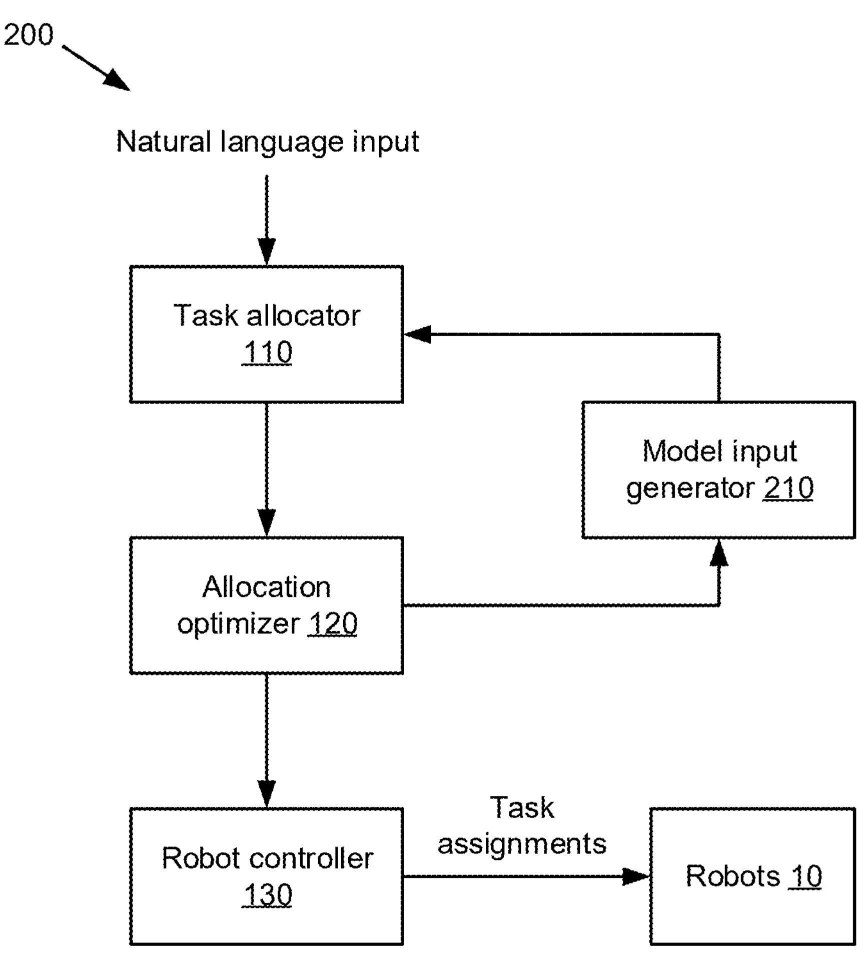

Turning next to FIG. 2, a block diagram of another system 200 that facilitates hybrid MRTA using LLMs is illustrated. Repetitive description of like parts described above with regard to other implementations is omitted for brevity. System 200 as shown in FIG. 2 can include a task allocator 110, an allocation optimizer 120, and a robot controller 130 that can function as described above with reference to FIG. 1. In addition, system 200 can include a model input generator 210 that can facilitate providing feedback from the allocation optimizer 120 back to the task allocator 110 in order to refine robot task allocations through iteration.

In an implementation, the model input generator 210 of system 200 can generate natural language input based on task allocations assigned by the allocation optimizer 120, e.g., as described above. The natural language input generated by the model input generator 210 can then be provided back to the task allocator 110, e.g., either in addition to or in place of a natural language input originally provided to the task allocator 110 as described above with respect to FIG. 1. Using this updated natural language input, the task allocator can update its task allocations based on a new output from its underlying language model that is generated based on the updated natural language input. As will be described in further detail below with reference to FIG. 4, the updated output of the language model at this stage can include additional information, such as a statement of a rationale, as determined by the language model, for the task allocations previously generated by the allocation optimizer 120.

In response to the task allocator 110 updating its task allocations as described above, the allocation optimizer 120 can also update its generated task allocations, via the same and/or different derivative-free optimization techniques utilized to generate its initial task allocations. Operation of the model input generator 210, task allocator 110, and allocation optimizer 120 can then iterate in this manner until a defined convergence criterion (e.g., a defined number of iterations, a total utility value associated with the task allocations generated by the allocation optimizer 120, etc.) is determined to have been satisfied. Upon the conclusion of this iteration, the robots 10 can be assigned tasks to perform by the robot controller 130 as described above with reference to FIG. 1.

Figure 3:
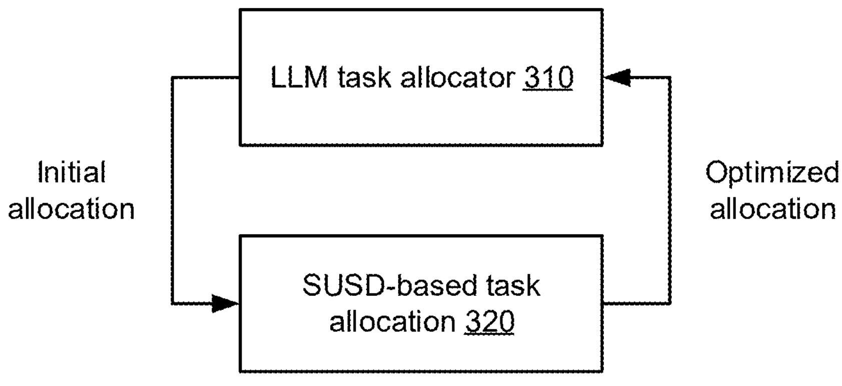
FIG. 3 is a functional block diagram of a hybrid MRTA process that can be utilized in accordance with various implementations described herein.

With reference now to FIG. 3, a hybrid MRTA approach that can be utilized by system 200 and/or other implementations as described herein is illustrated. The hybrid approach shown in FIG. 3 contains two components: an LLM task allocator 310 and an SUSD-based task allocation algorithm 320. The LLM task allocator 310 can generate an initial allocation, and then the SUSD-based task allocation algorithm 320 can improve the initial allocation and send an optimized allocation back to the LLM task allocator 310, as shown in FIG. 3. Various aspects of the procedure shown in FIG. 3 can be summarized as follows:

Hybrid optimization framework: Implementations as described herein can utilize the hybrid approach shown in FIG. 3, which integrates LLM-based heuristic generation with optimization algorithms such as SUSD. In doing so, performance improvements can be realized in comparison to traditional approaches in complex scenarios.

Leveraging in-context learning to the MRTA problem: By utilizing implementations as described herein, LLMs can refine their task allocation strategies over time without requiring human feedback training or utility function feedback. This can enhance task allocation processes within complex systems.

Applicability to practical applications: The capacity to translate natural language task descriptions into optimized robot actions as the potential to reduce the need for professional intervention. This capability can transform the management of multi-robot systems in real-world applications, which can decrease personnel, material costs, and/or response times across diverse environments. Moreover, the ability of robots to adapt to dynamic conditions through iterative field learning can provide improvements to scalability and adaptability, particularly within high-risk robotic applications such as search and rescue.

Unlike traditional methods that require specific mathematical formulations, the LLM task allocator 310 shown in FIG. 3 can use LLMs to process and interpret natural language descriptions of tasks and robot capabilities. This can allow non-expert users to input tasks in a straightforward manner, significantly lowering the barrier to effective robot task allocation. Additionally, the LLM task allocator 310 can utilize in-context learning to adapt its output based on the specifics of given tasks and capabilities of available robots without the need for retraining or extensive programming, enhancing its flexibility and responsiveness.

Following the initial task allocation by the LLM task allocator 310, the SUSD-based task allocation algorithm 320 can be employed to optimize the initial allocations. This dual-layered approach can ensure that the allocations are not only generated efficiently but are also refined to maximize overall system performance. Additionally, the SUSD-based task allocation algorithm 320 can adjust task allocations in response to real-time feedback on task execution and robot performance, e.g., as will be described in further detail below with reference to FIG. 13. This iterative process can result in continuous improvement in task allocations, making the system highly effective in dynamic environments.

As further shown in FIG. 3, a feedback mechanism can be utilized to feed optimized results from the SUSD-based task allocation algorithm 320 back to the LLM task allocator 310. This in-context feedback can allow the LLM to learn from past allocations and continually improve its future task allocation strategies. By automating the learning and improvement process through feedback loops in this manner, the system can minimize the need for human intervention, reducing operational costs and/or the potential for human error.

In an implementation, the SUSD-based task allocation algorithm 320 shown in FIG. 3 can operate according to a problem formulation involving optimization of a utility value. As will be described in further detail below, this utility value can be based on the ability of respective robots to complete respective tasks, distances between respective robots and their respective tasks, and/or other factors.

By way of example, the SUSD-based task allocation algorithm 320 can utilize a problem formulation in which a team of heterogeneous robots, denoted as $\mathcal{R}=\{R_1, R_2, \ldots, R_{n_R}\}$, is to complete a set of tasks $\mathcal{T}=\{T_1, T_2, \ldots, T_{n_T}\}$, where $n_R$ and $n_T$ represent the number of robots and the number of tasks, respectively. Each robot $R_i$ can be characterized by its specific capabilities and can be assigned to multiple tasks. Additionally, each task $T_j$ can require different capabilities from the robots. The above can be formulated as an integer programming problem, as shown in Equation (1) below:

$$\text{maximize } \sum_{i \in \mathcal{R}} u(x_i) \quad (1)$$

$$\text{subject to } x_{ij} \in \{0,1\},$$

$$\sum_{i=1}^{n_R} x_{ij} = 1, \forall j \in \mathcal{T}$$

In the above, $x_{ij}$ is a binary variable that indicates whether robot i has been assigned to task j. The goal of the problem given by Equation (1) is to determine an optimal allocation of tasks for each robot i, e.g., $x_i \in \{0,1\}^{n_T}$, that both (a) maximizes the overall utility $u(x_i)$ considering the diverse capabilities of the robots and the distances between the respective robots and tasks and (b) allocates a robot to each task to be assigned. As used herein, the matrix $$X = [x_1^\top, x_2^\top, \ldots, x_{n_R}^\top]^\top$$

represents the overall allocation.

To model the heterogeneous robot capabilities to different tasks, the variable $s_{ij} \geq 0$ can be used, which represents how effectively robot i can complete task j. A higher $s_{ij}$ indicates greater effectiveness, while $s_{ij}=0$ means the robot is unable to complete the task.

The utility of assigning task $T_j$ to robot $R_i$ can depend on both the suitability of the robot for the task and the distance between the robot and the task location. To account for the reduction in utility as distance increases, a distance-based discount factor $\alpha<1$ can be used. This factor can model the degradation of utility with increasing distance. The utility function for robot $R_i$, assigned a sequence of tasks $x_i$, can be defined as shown in Equation (2) below:

$$u(x_i) = \alpha^{\|r_i - p_{\gamma_1}\|^2} \cdot s_{i,\gamma_1} + \sum_{k=2}^{M_i} \alpha^{\|p_{\gamma_{k-1}} - p_{\gamma_k}\|^2} \cdot s_{i,\gamma_k} \quad (2)$$

In the above, the following definitions apply:

$r_i$ denotes the initial position of robot $R_i$, $P_{\gamma_1}$ is the position of the first task assigned to robot $R_i$, $P_{\gamma_k}$ represents the position of the k-th task in the sequence assigned to robot $R_i$, $M_i=\sum_{j \in \mathcal{T}} x_{ij}$ indicates the total number of tasks assigned to robot $R_i$, and $\gamma=[\gamma_1, \gamma_2, \ldots, \gamma_{M_i}]$ is the sequence of task indices assigned to robot $R_i$, ordered to minimize the total travel distance using a simple greedy algorithm.

The utility function given above can capture the effectiveness of task allocation considering both the suitability of robots for each task and the travel costs incurred due to distances between consecutive tasks.

The approach shown in FIG. 3 can combine the LLM task allocator 310 and an SUSD-based task allocation algorithm 320 to solve the MRTA problem in heterogeneous robot teams. With regard to these components, the LLM task allocator 310 can not only generate the initial task allocation but also actively participate in the optimization process. Through in-context learning, the LLM can continually refine its task allocation strategies based on feedback from SUSD optimization. This iterative process can allow the LLM to adapt and improve the allocation results over time. The SUSD-based task allocation algorithm 320 can then be applied to refine the initial task allocations provided by the LLM. The SUSD-based task allocation algorithm 320 can operate as a derivative-free optimization method that iteratively improves the allocation by navigating the solution space in search of higher utility configurations.

In an implementation, the approach shown in FIG. 3 can use the ability of an LLM to generate initial task allocations based on robot capabilities and task requirements, and then use the SUSD algorithm to optimize these allocations. The SUSD-optimized allocations can then be given back to the LLM, allowing the LLM to iteratively improve the allocations through in-context learning. A simplified representation of this process is outlined as shown in Table 1 below.

TABLE 1

| Example hybrid LLM and SUSD-based task allocation procedure. |
|---|
| procedure HYBRID-LLM-SUSD-TA($\mathcal{R}$, $\mathcal{T}$) |
| $X^{LLM} \leftarrow$ LLM-BASED($\mathcal{R}$, $\mathcal{T}$, S) |
| $\{\Theta_i^{(0)}\}_{i=1}^{n_v} \leftarrow INIT(\alpha, \beta, X^{LLM})$ |
| $X^{SUSD}, \Theta^{SUSD} \leftarrow SUSD(\{\Theta_i^{(0)}\}_{i=1}^{n_v})$ |
| return $X^{SUSD}, \Theta^{SUSD}$ |
| end procedure |

As used in Table 1, S is a matrix of task specifications, $\Theta$ is a parameter matrix (as will be described in further detail below), $n_v$ represents the number of candidate solutions, and $\alpha$ and $\beta$ are hyperparameters.

LLM Task Allocator as a Heuristic

In the first component of the approach shown in FIG. 3, the semantic processing capabilities of an LLM can be leveraged to perform an initial task allocation. The LLM can act as a heuristic, interpreting natural language descriptions of tasks and robot capabilities to generate a task allocation matrix. The LLM can receive a detailed natural language input describing the task environment. Table 2 below presents an example of an LLM prompt. As shown in Table 2, an LLM prompt can include the following:

Task descriptions, which can include information on the type of tasks that need to be performed. While not shown in Table 2, task location data, indicative of locations of respective tasks, can also be included.

Robot capabilities, which can include details about the specific capabilities of each robot. This can include the types of the respective robots (e.g., UAV, AUV, etc.) as well as the abilities of each robot to perform respective tasks of various types (e.g., whether a robot is better suited for inspection tasks, survey tasks, or both, etc.). While not shown in Table 2, robot location data, indicative of initial locations of respective robots, can also be included.

TABLE 2

| Example LLM input with task description and robot capabilities. |
|---|
| You are in charge of a task allocation for robots, involving three types of robots.<br>The first type is the hovering AUV, which is suitable for inspection tasks, and includes two robots: Robot 1 and Robot 2.<br>The second type is the lightweight AUV, suitable for survey tasks, with two robots: Robot 3 and Robot 4.<br>There is also Robot 4, which can perform both tasks.<br>I will now randomly assign you 15 tasks:<br>Tasks 1, 3, 5, 7, 9, 12, 13, and 14 are for inspection;<br>Tasks 2, 4, 6, 8, 10, 11, and 15 are for survey.<br>Now, please plan the tasks and tell me which tasks each robot should perform. |

The output of the LLM can take the form of a task allocation matrix $$X^{LLM}(0) = \left[x_1^\top, x_2^\top, \ldots, x_{n_R}^\top\right]^\top,$$

which can serve as the initial allocation of tasks to robots. This matrix can reflect the heuristic judgment of the LLM, mapping the best-suited robot to each task based solely on the semantic content of the input descriptions. The SUSD algorithm can then refine this allocation by optimizing the overall utility function.

SUSD Optimization

The SUSD algorithm is a derivative-free optimization technique inspired by the schooling behavior of fish. In SUSD, a group of virtual agents move together based on their local observations as well as communication with their neighbors. These virtual agents can convert toward a gradient direction without relying on explicit gradient calculations. This makes SUSD particularly well-suited for solving optimization problems where gradients are either ill-defined or difficult to compute, making it suitable for MRTA scenarios.

Continuous Relaxation and Sampling

To apply SUSD to MRTA problems, the integer constraints of the problem can first be relaxed by treating task allocation as samples from a probability distribution parameterized by a continuous matrix Θ. Specifically, the probability of assigning task $T_j$ to robot $R_i$ can be modeled using a softmax function as shown in Equation 3 below:

$$p_{ij} = \frac{e^{\Theta_{ij}}}{\sum_{m=1}^{n_R} e^{\Theta_{mj}}} \tag{3}$$

In the above, $\Theta_{ij}$ represents the parameter associated with assigning task $T_j$ to robot $R_i$.

Given this probabilistic model, valid task allocations X can be generated by sampling from the distribution $p(X|\Theta)$ using techniques like roulette-wheel selection.

SUSD Optimization Process

The SUSD strategy can use a group of virtual agents, each representing a candidate solution. These virtual agents can move based on the utility of their sampled task allocations in the parameter space to search for the optimal allocation matrix X*. At each iteration t, each virtual agent k can update its Ok according to the following rule, given by Equation 4:

$$vec(\Theta_k(t+1)) = vec(\Theta_k(t)) + \eta z_k(t) n(t) + u_k f(t) \tag{4}$$

In the above, the following definitions apply:

- $vec(\Theta_k(t))$ is the vectored form of the parameter matrix $\Theta_k(t)$,
- η is a step size parameter that controls the speed and stability of the search,
- $z_k(t)$ is a mapping based on the utility of the current allocation, encouraging movement towards better solutions,
- n(t) is the eigenvector corresponding to the smallest eigenvalue of the covariance matrix of the candidate solutions, guiding the search direction, and
- $u_k f(t)$ is a formation control term that helps keep the candidate solutions close together, promoting convergence.

By iterating the above process, the agents can move toward allocations with higher overall utility. The best solution found during the process can then be saved.

In-Context LLM Learning

Figure 4:
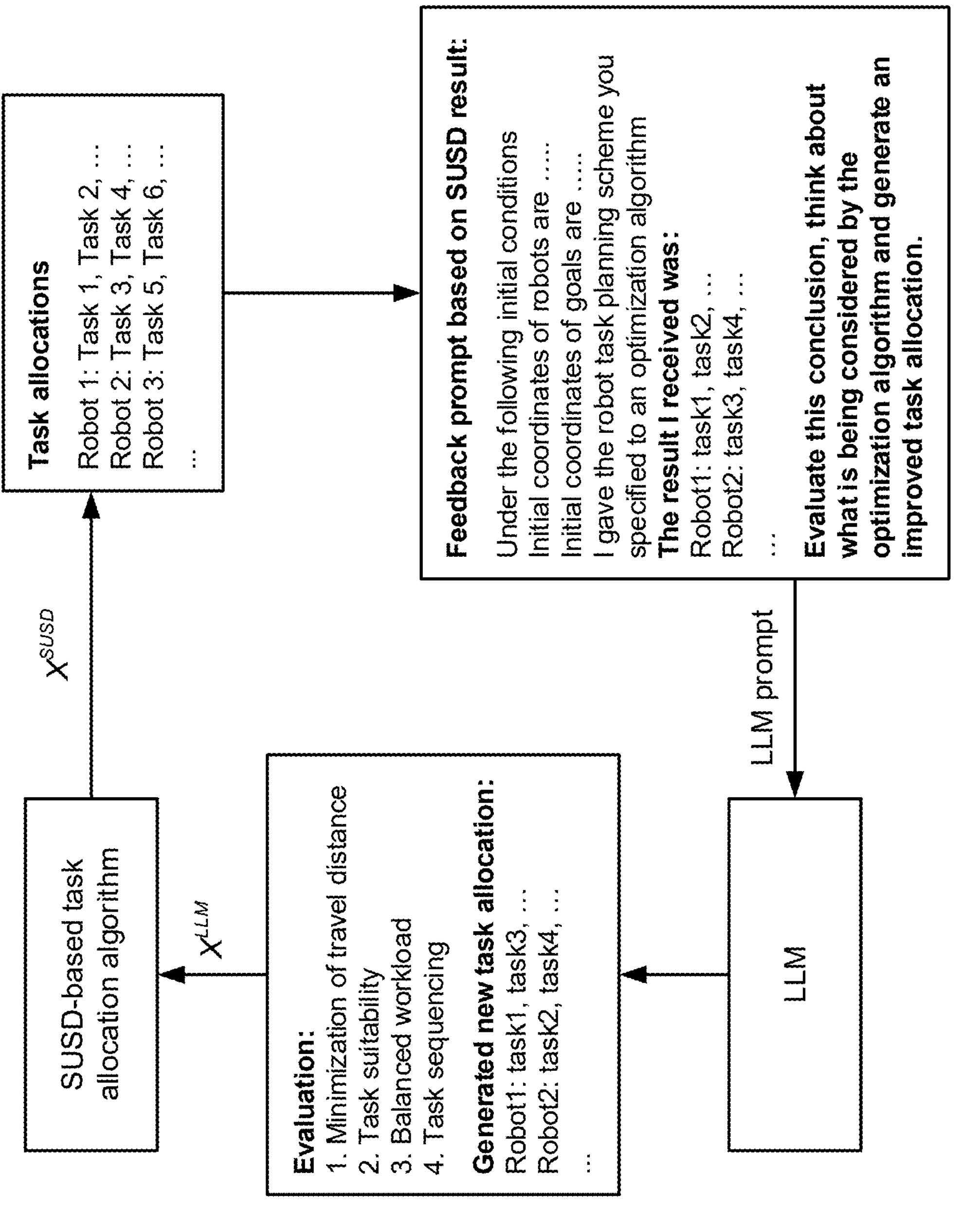
FIG. 4 is a diagram depicting example LLM prompts and MRTA operations that can be utilized in accordance with various implementations described herein.

As shown in FIG. 4, after the SUSD algorithm produces an optimized allocation, the results of that allocation, along with the positions of the robots and tasks, are feed back into the LLM. At this stage, the LLM can be asked to evaluate the optimized task allocation and provide reasoning for the results, such as why some robots were chosen over others based on their utility.

This interaction can enable the LLM to engage in a form of few-shot learning, where it gains insights into the task allocation goal and the underlying optimization criteria. Through multiple rounds of this iterative process, as the LLM has more and more data at its disposal, it can learn to make its initial task allocation strategy more consistent with the optimization objective, thus effectively "tuning" the LLM to the particular MRTA problem.

After each iteration of the SUSD optimization, the optimized allocation matrix $X^{SUSD}$ can be provided back to the LLM. The LLM can process this optimized result as part of its new input context, allowing it to refine its heuristic allocation strategy for the next iteration. This iterative loop can enable the LLM to continuously improve its task allocation strategy without direct feedback on the specific utility function or optimization metrics. This in-context learning process is represented by Table 3 below.

TABLE 3

Example in-context learning procedure with feedback.

```
procedure IN-CONTEXT-LEARNING( ℛ , 𝒯 , 𝒫 , X^SUSD (0))
  for t = 1 to n do
    X^LLM (t) ← LLM-BASED( ℛ , 𝒯 , 𝒫 , X^SUSD (t − 1))
    X^SUSD (t) ← SUSD (X^LLM (t))
    provide LLM with X^SUSD (t), ℛ , 𝒯 , 𝒫 for evaluation
  end for
  return X^SUSD, Θ^SUSD
end procedure
```

As used in Table 3, $\mathcal{P}$ is a set of robot positions and n represents the number of loop iterations.

Once the LLM has been tuned through in-context learning, it can be integrated back into the MRTA framework as the primary LLM task allocator. In its tuned state, the LLM can now generate more informed and effective initial task allocations, which can further be optimized by the SUSD algorithm.

Referring now to FIGS. 5-12, various performance metrics associated with a simulated system following the approach shown in FIG. 3 are illustrated. Various experiments were conducted using a simulated system in which a set of heterogeneous AUVs were positioned within a 30×30 meter map. Three types of AUVs were used: one that is suited for survey tasks, one that is suited for inspection tasks, and one that can perform both tasks. Sets of tasks including survey tasks and inspection tasks were used.

In the simulation represented by FIGS. 5-12, an LLM temperature of 0.5 was used to balance exploration and stability in LLM outputs. This setting allows the LLM to explore various task allocation strategies without compromising consistency or coherence.

Figure 5:
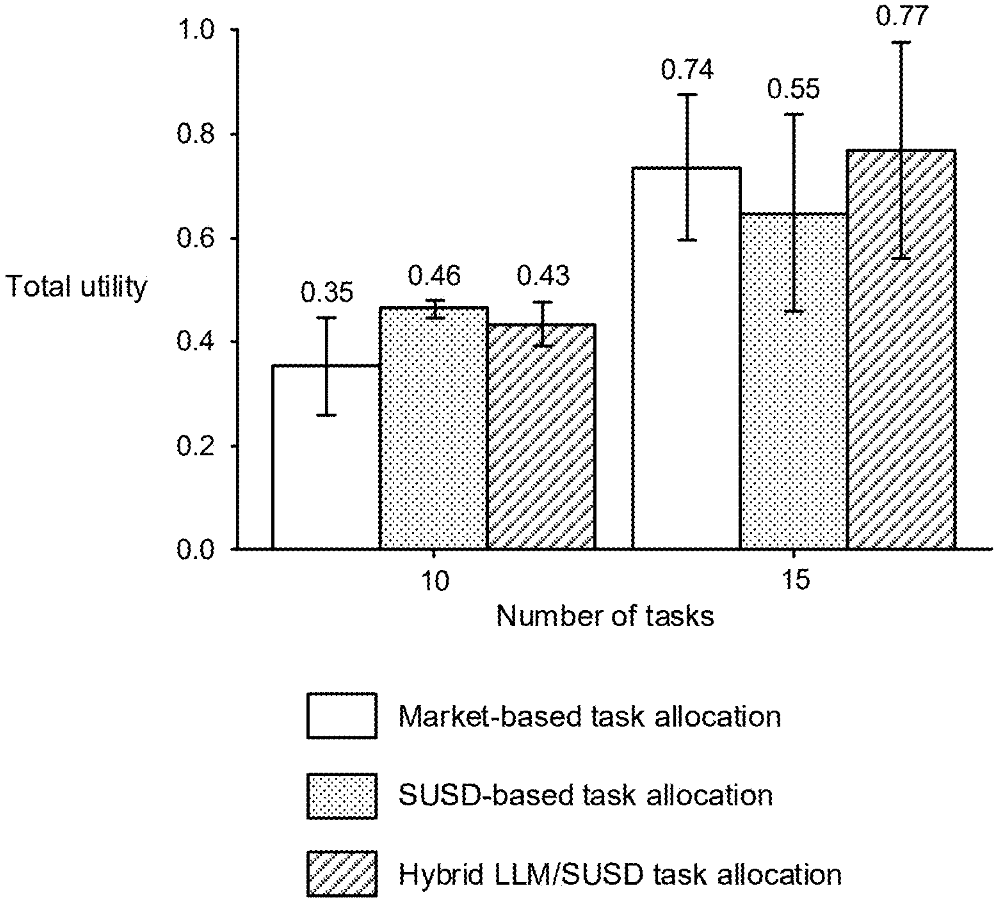
FIGS. 5-12 are diagrams depicting performance characteristics of example implementations of hybrid MRTA using LLMs as described herein.
Figure 6:
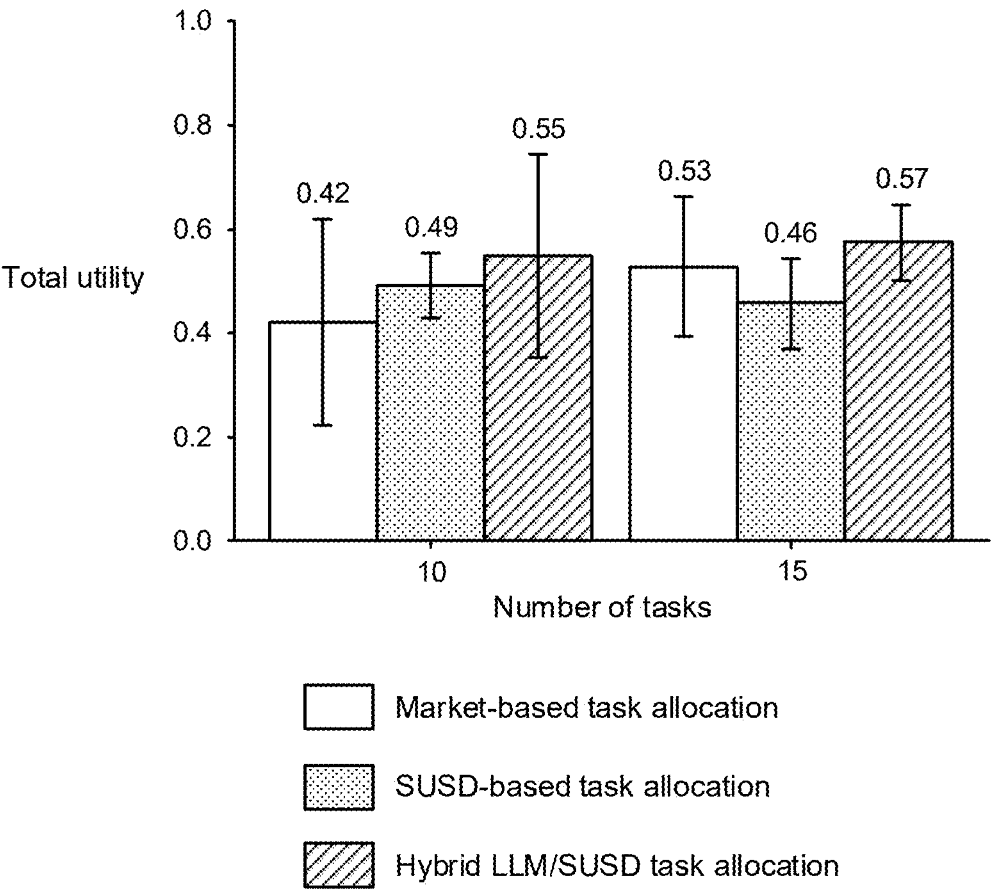
Figure 7:
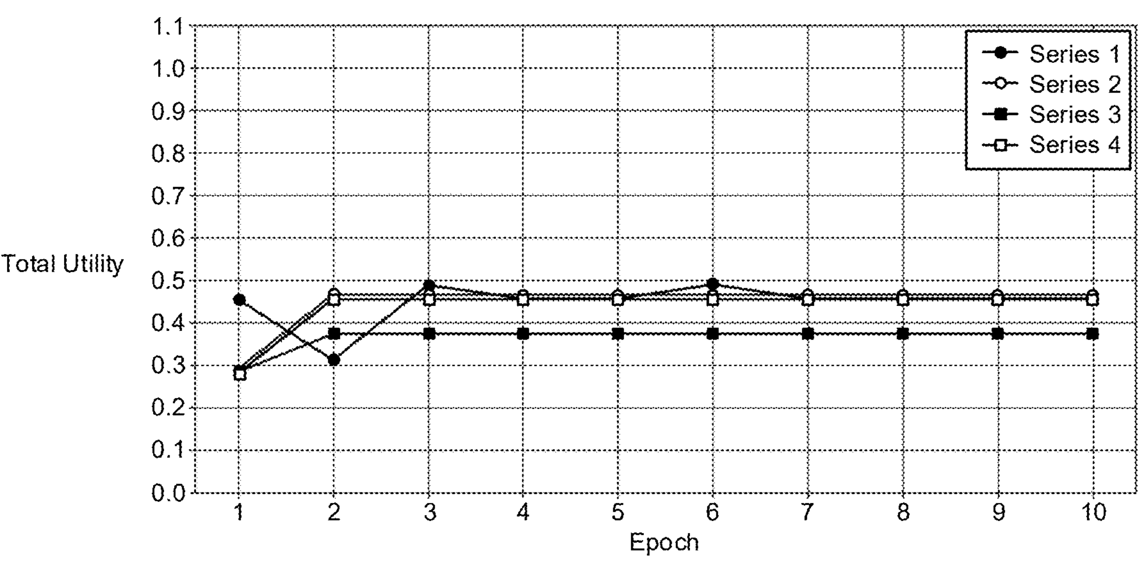
Figure 8:
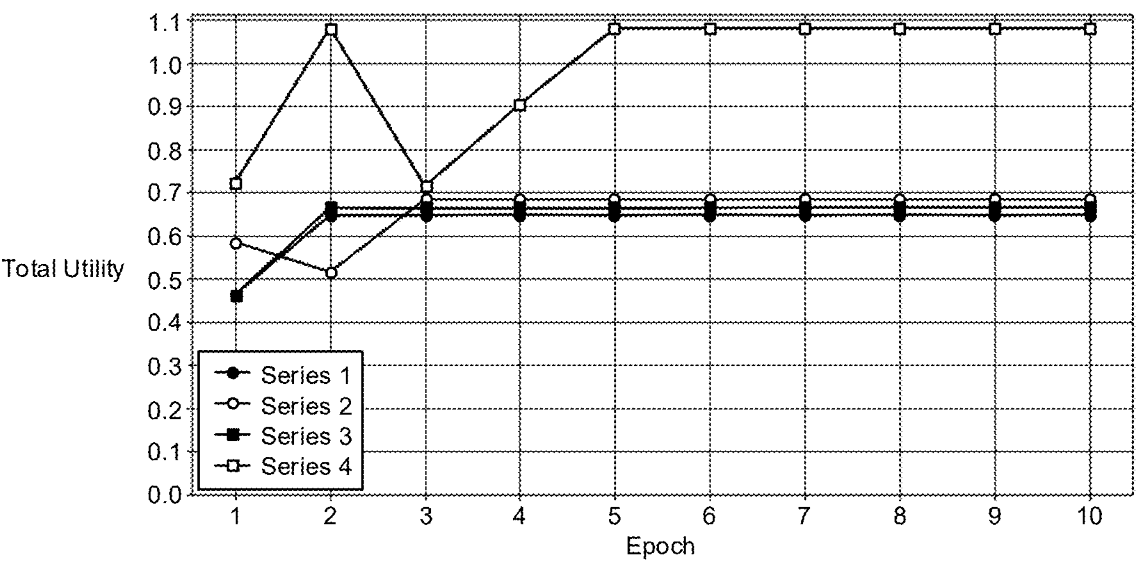
Figure 9:
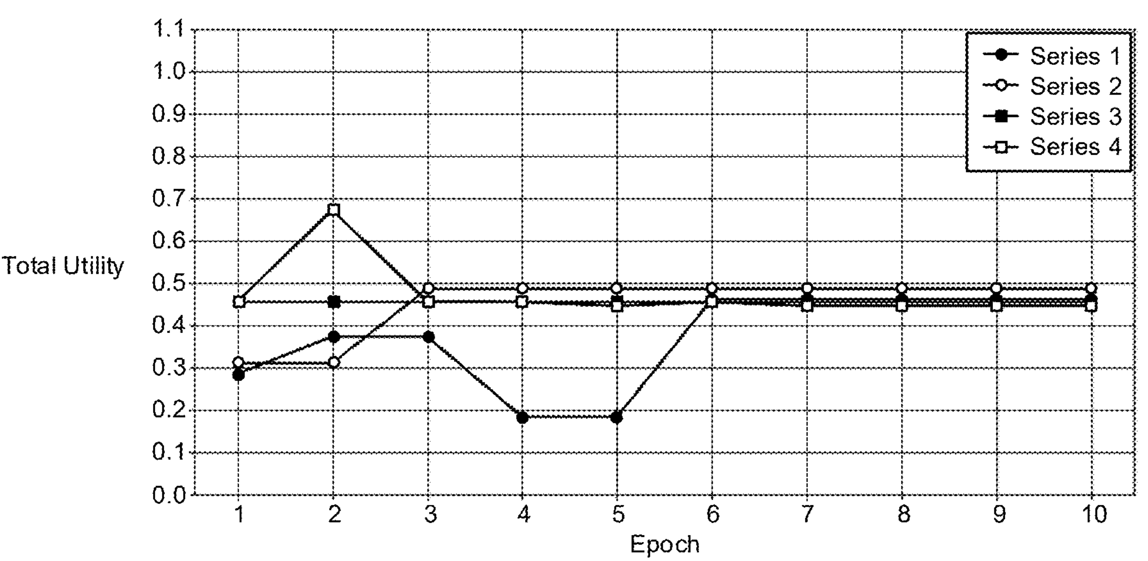
Figure 10:
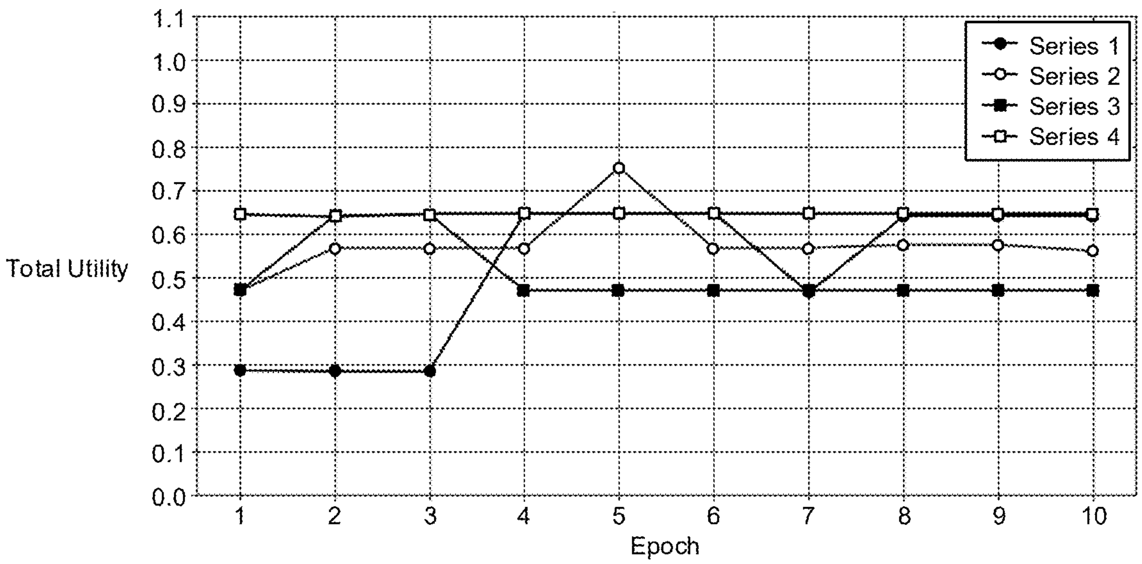

In a first set of simulation runs illustrated by FIGS. 5-6, the performance of the task allocation approach shown in FIG. 3 was tested using two different team sizes: 3 robots and 5 robots. For each team size, scenarios with 10 and 15 tasks were used to evaluate how well the algorithms scale with increasing task complexity. In each scenario, the approach shown in FIG. 3 was compared with a market-based task allocation algorithm and a SUSD-based task allocation algorithm. The primary metric for comparison across all tests is the total utility function, which measures the effectiveness of the task allocation in terms of both matching robot capabilities with task requirements as well as minimizing the cost of task execution. All three scenarios shown by FIGS. 5-6 were measured by same utility function.

As shown in FIGS. 5-6, the hybrid approach shown in FIG. 3 outperforms the SUSD-only approach, especially when the number of robots increases and the number of tasks increases. The approach shown in FIG. 3 achieves higher utility values for both 3-robot and 5-robot teams, indicating better overall task allocation. This improvement suggests that combining an LLM with derivative-free optimization can achieve more effective scaling when handling greater numbers of tasks. For instance, the LLM can learn the optimization capabilities of SUSD during in-context learning and produce higher-quality allocation results to SUSD.

Turning now to FIGS. 7-12, results of respective simulations used to verify the performance change of the overall hybrid approach shown in FIG. 3 during the multi-iteration process of an LLM are presented. The conditions are the same as those associated with FIGS. 5-6, i.e., using 3 and 5 robots to assign 10 and 15 tasks, respectively.

As presented in FIGS. 7-10, the total utility values demonstrate varying trends across different scenarios, reflecting the dynamic nature of the iterative learning process of the LLM. Initially, some fluctuations in utility are observed, especially in the early epochs, which can be attributed to the LLM adaptation phase as the LLM refines its understanding of task allocation through in-context learning. Over subsequent epochs, the utility values tend to stabilize, indicating that the LLM is effectively learning and improving the task allocation with each iteration.

For both 3-robot and 5-robot teams, the overall trend shows that the hybrid approach maintains or slightly improves total utility over time despite the complexity introduced by the increased number of tasks. This suggests that when an LLM is combined with derivative-free optimization, the LLM generates more effective task allocations during in-context learning.

Figure 11:
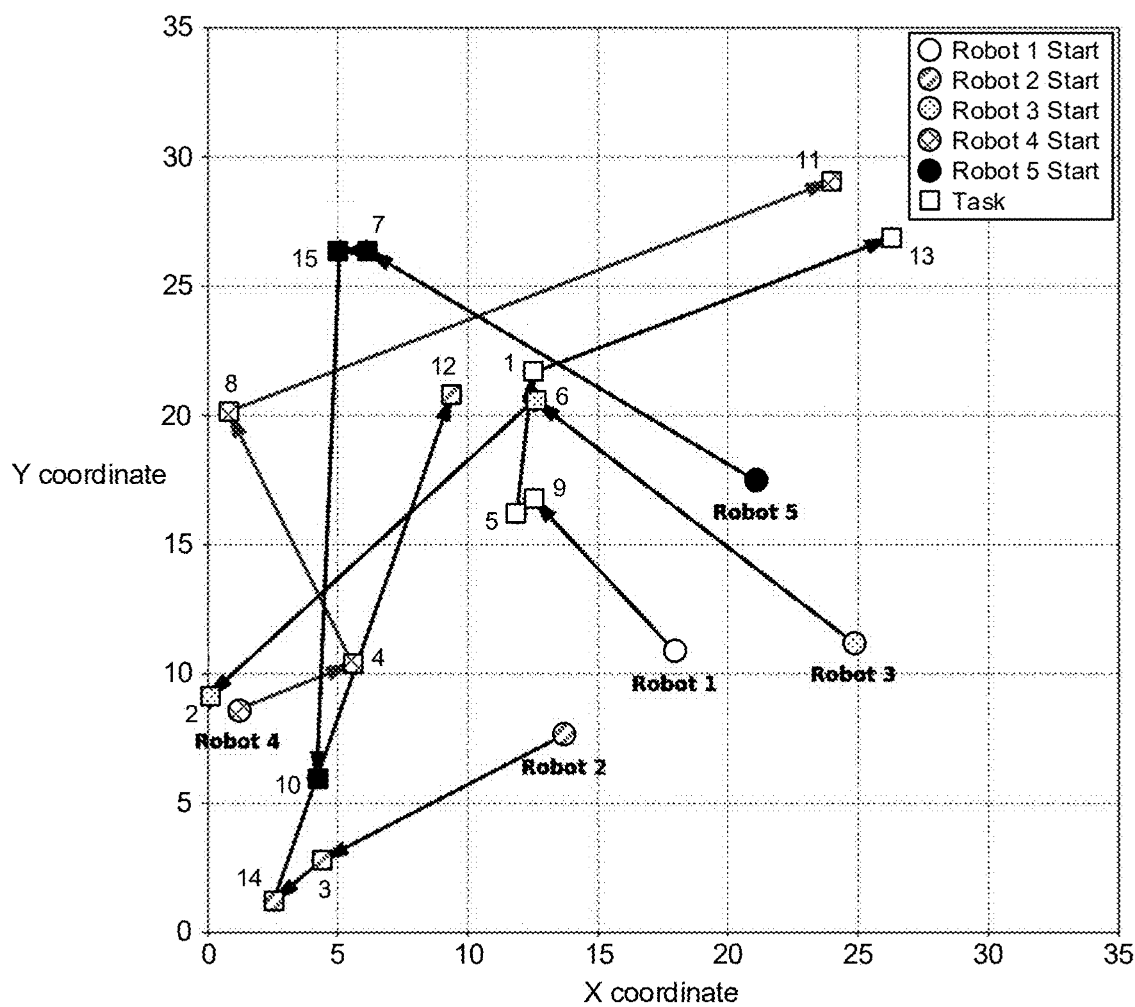
Figure 12:
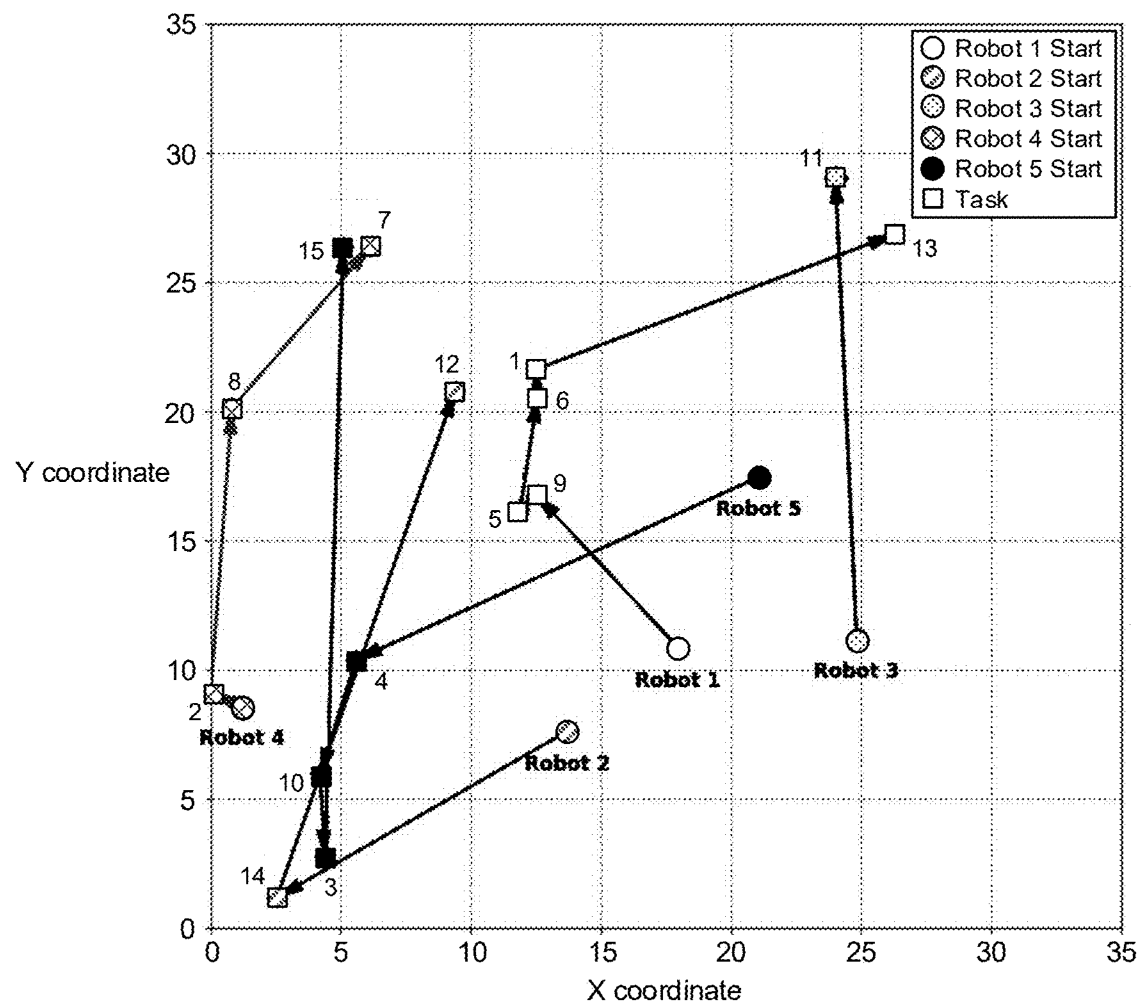

FIGS. 11-12 depict a visualization of the task allocation results of the hybrid method in the simulations associated with FIGS. 7-10. These two figures show that the total utility of task allocation increases from 0.4679 to 0.5601. At the same time, the task allocation path is more direct, reducing the overall distance traveled by the robots. This improvement further proves that an LLM can better optimize the allocation to improve the overall system performance through in-context learning.

Figure 13:
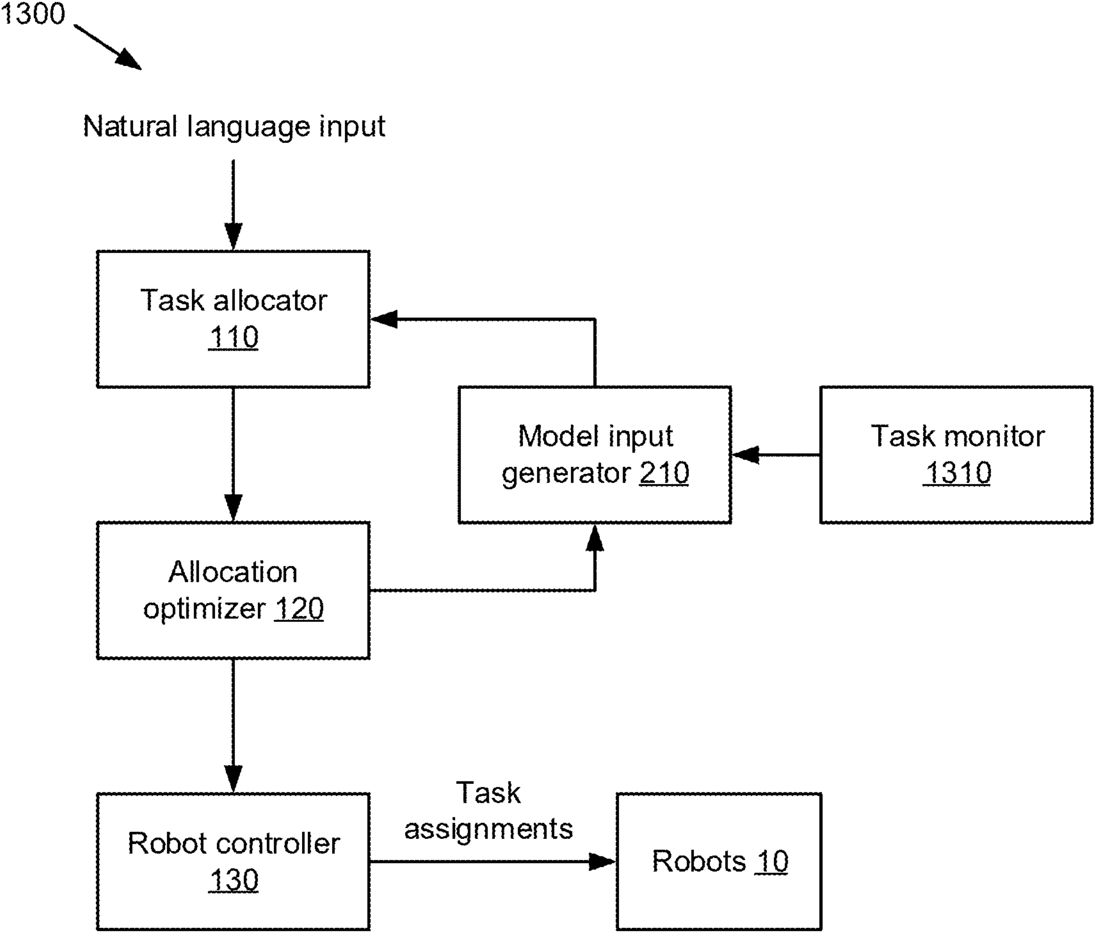
FIG. 13 is a block diagram of another system that facilitates hybrid MRTA using LLMs in accordance with various implementations described herein.

With reference now to FIG. 13, a block diagram of another system 1300 that facilitates hybrid MRTA using LLMs is illustrated. Repetitive description of like parts described above with regard to other implementations is omitted for brevity. System 1300 as shown in FIG. 13 includes a task allocator 110, an allocation optimizer 120, and a model input generator 210 that can act as a feedback loop to provide robot-to-task assignments to a robot controller 130, e.g., as described above with respect to FIG. 2. System 1300 additionally includes a task monitor 1310, which can be utilized to adapt task allocations generated by system 1300 based on changes to task conditions and/or requirements, e.g., as given by real-time verbal or written descriptions of those changes.

In an implementation, the task monitor 1310 can provide supplemental natural language input, including task modification information representative of a modification to at least one task to be assigned to a group of robots 10, to the model input generator 210 (e.g., for transferal to the task allocator 110). The task allocator 110 can then update its task allocations based on this supplemental input.

In some implementations, the task monitor 1310 can include one or more user interfaces (e.g., voice interfaces, text interfaces, etc.) that can enable a user to manually provide updated natural language input and/or other information, such as task or condition update information, upon which the updated natural language input can be generated. In other implementations, the task monitor 1310 can include one or more sensors (e.g., wind, temperature, and/or precipitation sensors, radar devices, sonar devices, etc.) that can detect changes to task requirements and/or conditions and automatically generate updated natural language input in response to those changes.

Figure 14:
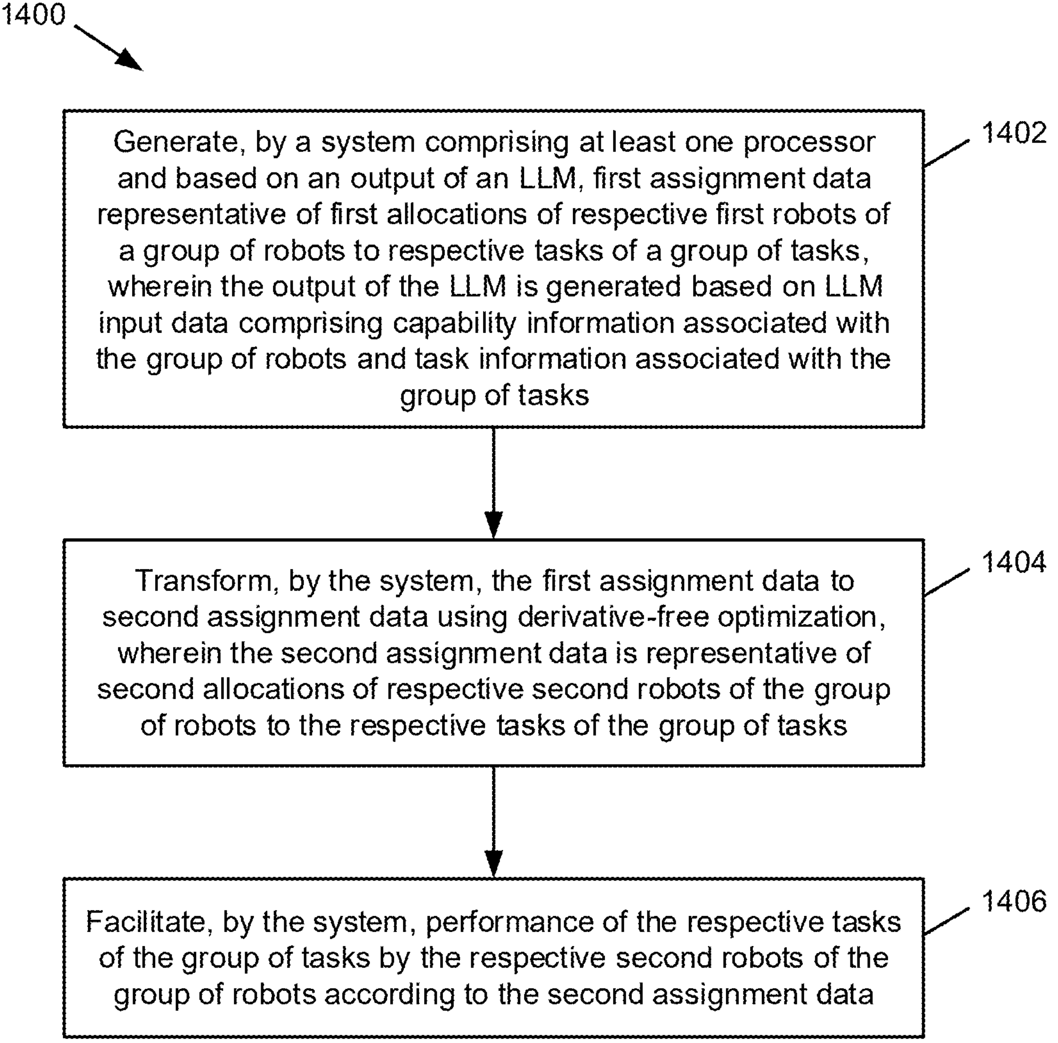
FIGS. 14-15 are flow diagrams of respective methods that facilitate hybrid MRTA using LLMs in accordance with various implementations described herein.

Referring now to FIG. 14, a flow diagram of a method 1400 that facilitates hybrid MRTA using LLMs is illustrated. At 1402, a system comprising at least one processor can generate (e.g., by a task allocator 110), based on an output of an LLM, first assignment data representative of first allocations of respective first robots of a group of robots (e.g., a group of robots 10) to respective tasks of a group of tasks. The output of the LLM can be generated based on LLM input data, which can include capability information associated with the group of robots and task information associated with the group of tasks.

At 1404, the system can transform (e.g., by an allocation optimizer) the first assignment data generated at 1402 to second assignment data using derivative-free optimization. The second assignment data can be representative of second allocations of respective second robots of the group of robots to the respective tasks of the group of tasks.

At 1406, the system can facilitate (e.g., by a robot controller 130) performance of the respective tasks of the group of tasks by the respective second robots of the group of robots according to the second assignment data generated at 1404.

Figure 15:
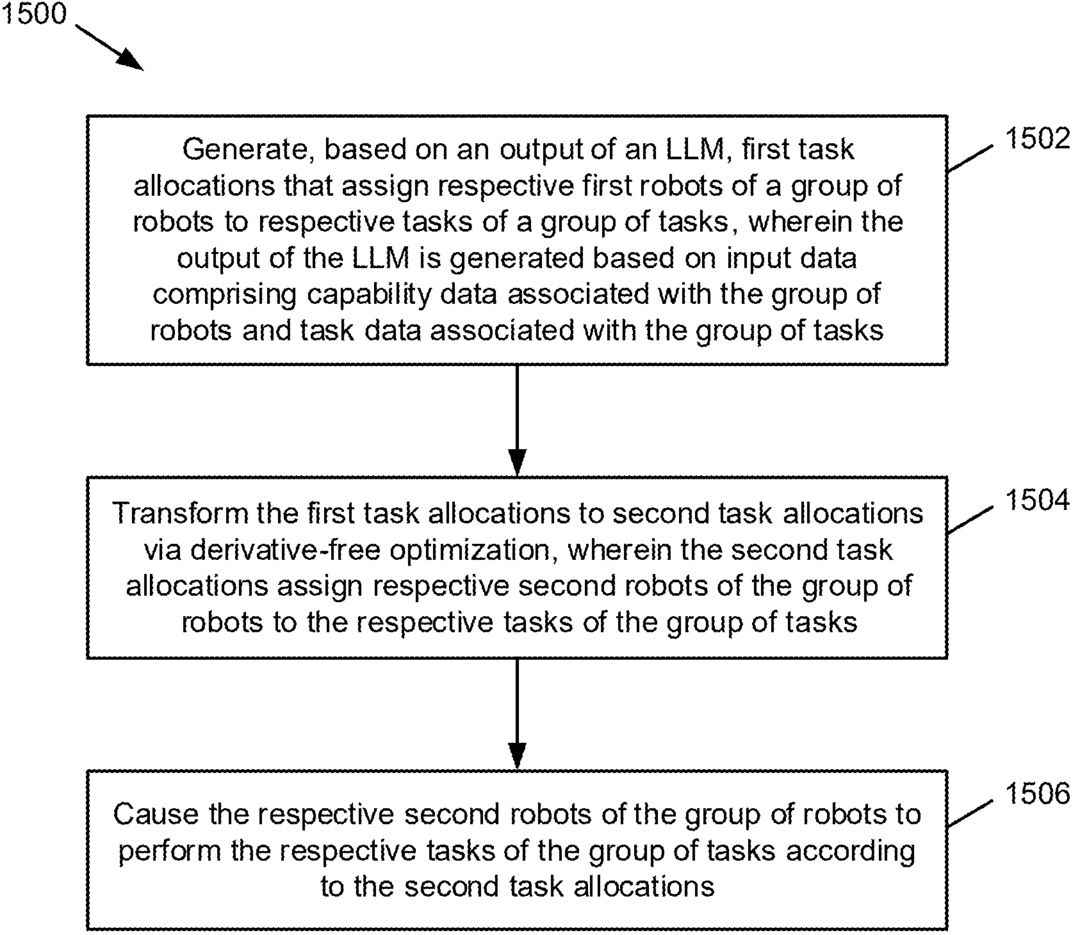

Referring next to FIG. 15, a flow diagram of a method 1500 that can be performed by at least one processor, e.g., based on machine-executable instructions stored on a non-transitory machine-readable medium, is illustrated. An example of a computer architecture, including a processor and non-transitory media, that can be utilized to implement method 1500 is described below with respect to FIG. 16.

Method 1500 can begin at 1502, in which the at least one processor can generate, based on an output of an LLM, first task allocations that assign respective first robots of a group of robots to respective tasks of a group of tasks. The output of the LLM can be generated based on input data that includes capability data associated with the group of robots and task data associated with the group of tasks.

At 1504, the at least one processor can transform the first task allocations to second task allocations via derivative-free optimization. The second task allocations can assign respective second robots of the group of robots to the respective tasks of the group of tasks.

At 1506, the at least one processor can cause the respective second robots of the group of robots to perform the respective tasks of the group of tasks according to the second task allocations.

FIGS. 14-15 as described above illustrate methods in accordance with certain embodiments of this disclosure. While, for purposes of simplicity of explanation, the methods have been shown and described as series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain embodiments of this disclosure.

Figure 16:
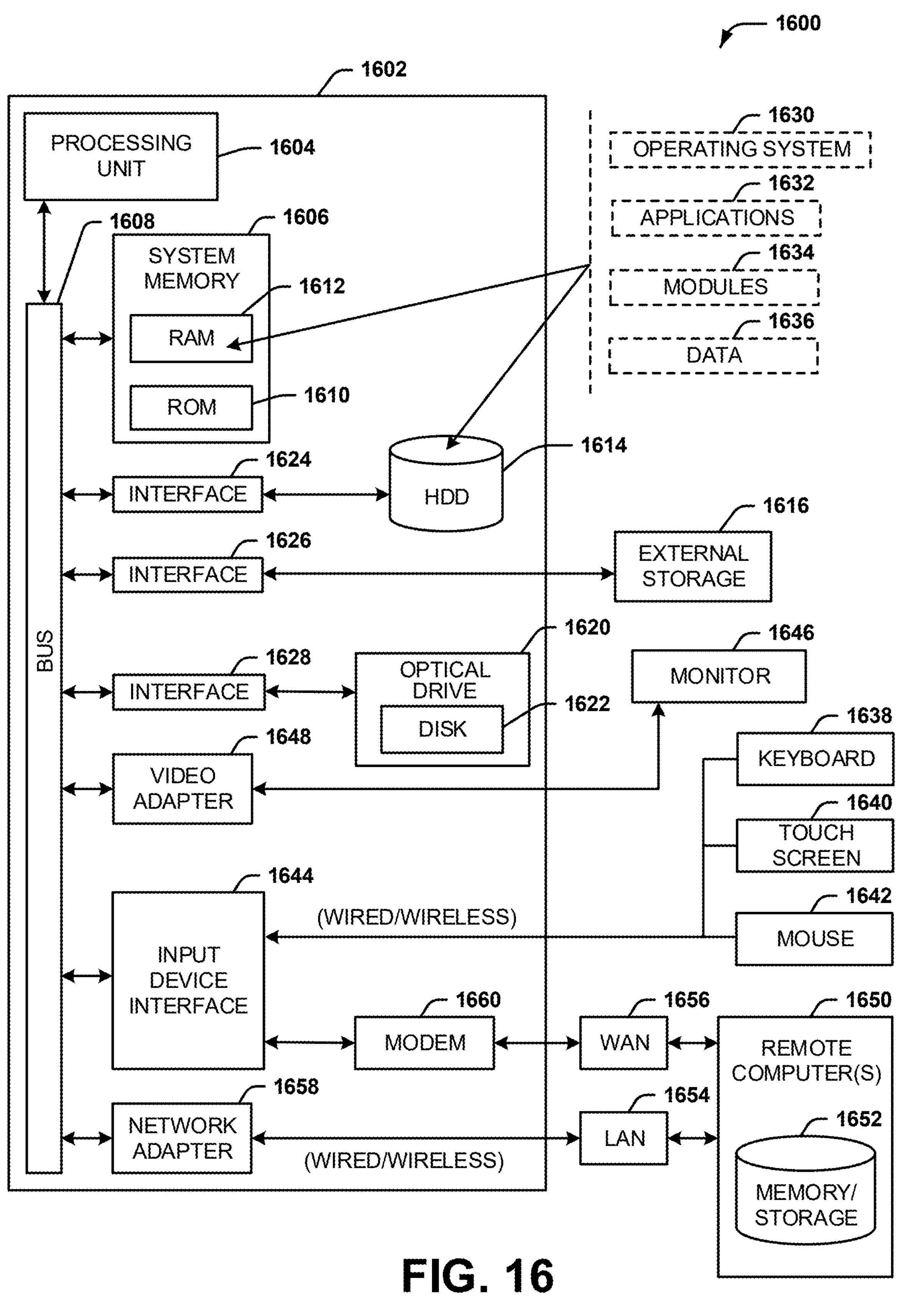
FIG. 16 is a diagram of an example computing environment in which various implementations described herein can function.

In order to provide additional context for various embodiments described herein, FIG. 16 and the following discussion are intended to provide a brief, general description of a suitable computing environment 1600 in which the various embodiments of the embodiment described herein can be implemented. While implementations have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference now to FIG. 16, an example general-purpose environment 1600 for implementing various embodiments described herein includes a computer 1602, the computer 1602 including a processing unit 1604, a system memory 1606 and a system bus 1608. The system bus 1608 couples system components including, but not limited to, the system memory 1606 to the processing unit 1604. The processing unit 1604 can be any of various commercially available processors. Dual microprocessors and other multi-processor architectures can also be employed as the processing unit 1604.

The system bus 1608 can be any of several types of bus structure that can further interconnect to a memory bus (with or without a memory controller), a peripheral bus, and a local bus using any of a variety of commercially available bus architectures. The system memory 1606 includes ROM 1610 and RAM 1612. A basic input/output system (BIOS) can be stored in a non-volatile memory such as ROM, erasable programmable read only memory (EPROM), EEPROM, which BIOS contains the basic routines that help to transfer information between elements within the computer 1602, such as during startup. The RAM 1612 can also include a high-speed RAM such as static RAM for caching data.

The computer 1602 further includes an internal hard disk drive (HDD) 1614 (e.g., EIDE, SATA), one or more external storage devices 1616 (e.g., a magnetic floppy disk drive (FDD), a memory stick or flash drive reader, a memory card reader, etc.) and an optical disk drive 1620 (e.g., which can read or write from a CD-ROM disc, a DVD, a BD, etc.). While the internal HDD 1614 is illustrated as located within the computer 1602, the internal HDD 1614 can also be configured for external use in a suitable chassis (not shown). Additionally, while not shown in environment 1600, a solid state drive (SSD) could be used in addition to, or in place of, an HDD 1614. The HDD 1614, external storage device(s) 1616 and optical disk drive 1620 can be connected to the system bus 1608 by an HDD interface 1624, an external storage interface 1626 and an optical drive interface 1628, respectively. The interface 1624 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1602, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1612, including an operating system 1630, one or more application programs 1632, other program modules 1634 and program data 1636. All or portions of the operating system, applications, modules, and/or data can also be cached in the RAM 1612. The systems and methods described herein can be implemented utilizing various commercially available operating systems or combinations of operating systems.

Computer 1602 can optionally comprise emulation technologies. For example, a hypervisor (not shown) or other intermediary can emulate a hardware environment for operating system 1630, and the emulated hardware can optionally be different from the hardware illustrated in FIG. 16. In such an embodiment, operating system 1630 can comprise one virtual machine (VM) of multiple VMs hosted at computer 1602. Furthermore, operating system 1630 can provide runtime environments, such as the Java runtime environment or the .NET framework, for applications 1632. Runtime environments are consistent execution environments that allow applications 1632 to run on any operating system that includes the runtime environment. Similarly, operating system 1630 can support containers, and applications 1632 can be in the form of containers, which are lightweight, standalone, executable packages of software that include, e.g., code, runtime, system tools, system libraries and settings for an application.

Further, computer 1602 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1602, e.g., applied at the application execution level or at the operating system (OS) kernel level, thereby enabling security at any level of code execution.

A user can enter commands and information into the computer 1602 through one or more wired/wireless input devices, e.g., a keyboard 1638, a touch screen 1640, and a pointing device, such as a mouse 1642. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1604 through an input device interface 1644 that can be coupled to the system bus 1608, but can be connected by other interfaces, such as a parallel port, an IEEE 1394 serial port, a game port, a USB port, an IR interface, a BLUETOOTH® interface, etc.

A monitor 1646 or other type of display device can be also connected to the system bus 1608 via an interface, such as a video adapter 1648. In addition to the monitor 1646, a computer typically includes other peripheral output devices (not shown), such as speakers, printers, etc.

The computer 1602 can operate in a networked environment using logical connections via wired and/or wireless communications to one or more remote computers, such as a remote computer(s) 1650. The remote computer(s) 1650 can be a workstation, a server computer, a router, a personal computer, portable computer, microprocessor-based entertainment appliance, a peer device or other common network node, and typically includes many or all of the elements described relative to the computer 1602, although, for purposes of brevity, only a memory/storage device 1652 is illustrated. The logical connections depicted include wired/wireless connectivity to a local area network (LAN) 1654 and/or larger networks, e.g., a wide area network (WAN) 1656. Such LAN and WAN networking environments are commonplace in offices and companies, and facilitate enterprise-wide computer networks, such as intranets, all of which can connect to a global communications network, e.g., the Internet.

When used in a LAN networking environment, the computer 1602 can be connected to the local network 1654 through a wired and/or wireless communication network interface or adapter 1658. The adapter 1658 can facilitate wired or wireless communication to the LAN 1654, which can also include a wireless access point (AP) disposed thereon for communicating with the adapter 1658 in a wireless mode.

When used in a WAN networking environment, the computer 1602 can include a modem 1660 or can be connected to a communications server on the WAN 1656 via other means for establishing communications over the WAN 1656, such as by way of the Internet. The modem 1660, which can be internal or external and a wired or wireless device, can be connected to the system bus 1608 via the input device interface 1644. In a networked environment, program modules depicted relative to the computer 1602 or portions thereof, can be stored in the remote memory/storage device 1652. It will be appreciated that the network connections shown are example and other means of establishing a communications link between the computers can be used.

When used in either a LAN or WAN networking environment, the computer 1602 can access cloud storage systems or other network-based storage systems in addition to, or in place of, external storage devices 1616 as described above. Generally, a connection between the computer 1602 and a cloud storage system can be established over a LAN 1654 or WAN 1656 e.g., by the adapter 1658 or modem 1660, respectively. Upon connecting the computer 1602 to an associated cloud storage system, the external storage interface 1626 can, with the aid of the adapter 1658 and/or modem 1660, manage storage provided by the cloud storage system as it would other types of external storage. For instance, the external storage interface 1626 can be configured to provide access to cloud storage sources as if those sources were physically connected to the computer 1602.

The computer 1602 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any embodiment or design described herein as "exemplary" and/or "demonstrative" is not necessarily to be construed as preferred or advantageous over other embodiments or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word-without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:

at least one processor; and at least one memory that stores executable instructions that, when executed by the at least one processor, facilitate performance of operations, the operations comprising:

generating, based on an output of a language model, first task allocations that associate respective first robots of a group of robots with respective tasks of a group of tasks, wherein the output of the language model is generated based on a natural language input comprising capability information associated with the group of robots and task information associated with the group of tasks;

transforming the first task allocations to second task allocations via derivative-free optimization, wherein the second task allocations associate respective second robots of the group of robots with the respective tasks of the group of tasks; and causing the respective second robots of the group of robots to perform the respective tasks of the group of tasks according to the second task allocations.

2. The system of claim 1, wherein the output of the language model is a first output, wherein the natural language input is a first natural language input, and wherein the operations further comprise:

generating a second natural language input based on the second task allocations; and updating the first task allocations based on a second output of the language model, the second output being generated based on the second natural language input.

3. The system of claim 2, wherein the second output of the language model comprises a statement of a rationale, as determined by the language model, for the second task allocations.

4. The system of claim 2, wherein the operations further comprise:

updating the second task allocations via the derivative-free optimization in response to the updating of the first task allocations.

5. The system of claim 4, wherein the operations further comprise:

repeating the generating of the second natural language input, the updating of the first task allocations, and the updating of the second task allocations until a convergence criterion is determined to have been satisfied.

6. The system of claim 1, wherein the derivative-free optimization comprises a speed-up and slow-down (SUSD) optimization procedure.

7. The system of claim 1, wherein the derivative-free optimization comprises optimization of a utility value, the utility value being representative of a metric selected from a group of metrics comprising ability of the respective second robots of the group of robots to complete the respective tasks of the group of tasks and distances between the respective second robots of the group of robots and the respective tasks of the group of tasks.

8. The system of claim 1, wherein the capability information is of a category selected from a group of categories comprising a robot type category, indicative of types of respective robots of the group of robots, a robot location category, indicative of initial locations of the respective robots of the group of robots, and a robot ability category, indicative of respective abilities of the respective robots of the group of robots to perform the respective tasks of the group of tasks.

9. The system of claim 1, wherein the task information is of a category selected from a group of categories comprising a task type category, indicative of task types of the respective tasks of the group of tasks, and a task location category, indicative of locations of the respective tasks of the group of tasks.

10. The system of claim 1, wherein the respective tasks of the group of tasks are of at least one task type selected from a group of task types comprising a disaster response task type, an industrial automation task type, an environmental monitoring task type, and an agriculture task type.

11. The system of claim 1, wherein the output of the language model is a first output, wherein the natural language input is a first natural language input, and wherein the operations further comprise:

providing a second natural language input to the language model, the second natural language input comprising task modification information representative of a modification to at least one task of the group of tasks; and based on a second output generated by the language model in response to the second natural language input, updating the first task allocations.

12. A method, comprising:

generating, by a system comprising at least one processor and based on an output of a large language model (LLM), first assignment data representative of first allocations of respective first robots of a group of robots to respective tasks of a group of tasks, wherein the output of the LLM is generated based on LLM input data comprising capability information associated with the group of robots and task information associated with the group of tasks;

transforming, by the system, the first assignment data to second assignment data using derivative-free optimization, wherein the second assignment data is representative of second allocations of respective second robots of the group of robots to the respective tasks of the group of tasks; and facilitating, by the system, performance of the respective tasks of the group of tasks by the respective second robots of the group of robots according to the second assignment data.

13. The method of claim 12, wherein the output of the LLM is a first output, wherein the LLM input data is first LLM input data, and wherein the method further comprises:

generating, by the system, second LLM input data based on the second assignment data; and updating, by the system, the first assignment data based on a second output generated by the LLM in response to the second LLM input data.

14. The method of claim 13, further comprising:

updating, by the system, the second assignment data via the derivative-free optimization in response to the updating of the first assignment data.

15. The method of claim 14, further comprising:

iterating, by the system, the generating of the second LLM input data, the updating of the first assignment data, and the updating of the second assignment data until a convergence criterion is determined to have been satisfied.

16. The method of claim 12, wherein the derivative-free optimization comprises a speed-up and slow-down (SUSD) optimization procedure.

17. A non-transitory machine-readable medium comprising computer executable instructions that, when executed by at least one processor, facilitate performance of operations, the operations comprising:

generating, based on an output of a large language model (LLM), first task allocations that assign respective first robots of a group of robots to respective tasks of a group of tasks, wherein the output of the LLM is generated based on input data comprising capability data associated with the group of robots and task data associated with the group of tasks;

transforming the first task allocations to second task allocations via derivative-free optimization, wherein the second task allocations assign respective second robots of the group of robots to the respective tasks of the group of tasks; and causing the respective second robots of the group of robots to perform the respective tasks of the group of tasks according to the second task allocations.

18. The non-transitory machine-readable medium of claim 17, wherein the output of the LLM is a first output, wherein the input data is first input data, and wherein the operations further comprise:

generating second input data based on the second task allocations; and updating the first task allocations based on a second output of the LLM, the second output being generated based on the second input data.

19. The non-transitory machine-readable medium of claim 18, wherein the operations further comprise:

updating the second task allocations via the derivative-free optimization in response to the updating of the first task allocations.

20. The non-transitory machine-readable medium of claim 19, wherein the operations further comprise:

iterating the generating of the second input data, the updating of the first task allocations, and the updating of the second task allocations until a defined number of iterations has been determined to have been performed.

* * * * *